(No Model.)

H. H. BALTZLEY.
FLY BRUSH FOR DOORS.

No. 269,375.                    Patented Dec. 19, 1882.

WITNESSES
P. B. Turpin,
J. N. Griffin

INVENTOR
Henry H. Baltzley
By R. S. & A. P. Lacey
ATTORNEYS.

UNITED STATES PATENT OFFICE.

HENRY H. BALTZLEY, OF ASSUMPTION, ILLINOIS.

FLY-BRUSH FOR DOORS.

SPECIFICATION forming part of Letters Patent No. 269,375, dated December 19, 1882.

Application filed May 10, 1882. (No model.)

*To all whom it may concern:*

Be it known that I, HENRY H. BALTZLEY, a citizen of the United States, residing at Assumption, in the county of Christian and State of Illinois, have invented certain new and useful Improvements in Fly-Brushes for Doors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to devices for keeping flies, &c., from entering houses or rooms when the doors thereto are opened; and it consists in the construction and arrangement of the several parts, as will be hereinafter fully described, and specifically pointed out in the claims.

Figure 1:
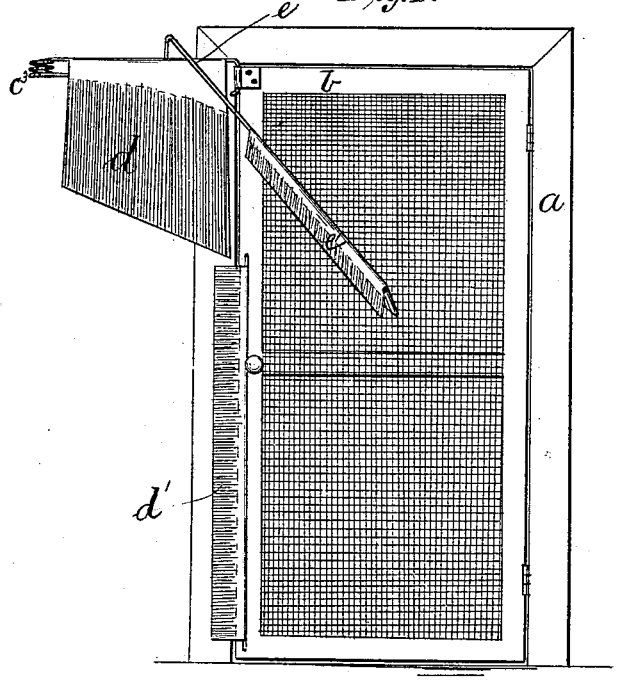
Figure 2:
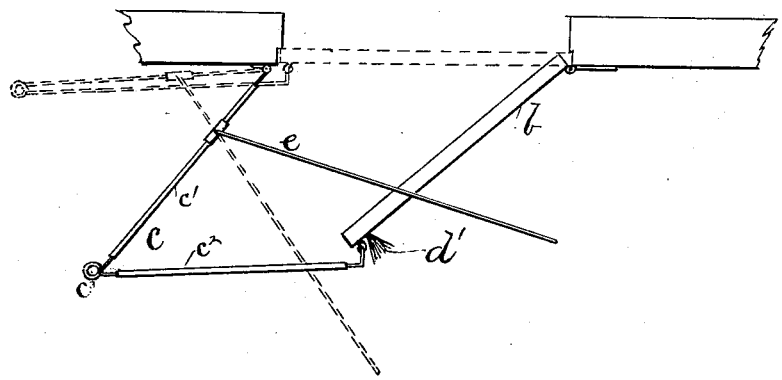

In the drawings, Figure 1 is an elevation, and Fig. 2 is a plan view, of a device constructed according to my invention.

$a$ represents the door-frame. $b$ represents the door.

$c$ represents a brush or fringe-carrier composed of the bars $c'$ $c^2$, connected by the coil-spring $c^3$. The bar $c'$ is secured to the door-frame and connected by spring $c^3$ to bar $c^2$, which is connected to the door near the top of same, as shown. The action of the spring $c^3$ is to keep the bars $c'$ $c^2$ in the position shown in dotted lines, Fig. 2, and keep the door shut and shut it when opened.

$d$ $d$ represent fringe made of cotton, paper, or any equivalent light material. It is secured to the bars $c'$ $c^2$ and hangs down, as shown in Fig. 1. I preferably make this fringe longest at the door and gradually shorter, as shown.

It is difficult to prevent flies from getting into a room when the door is opened, and my device is especially intended to meet this difficulty. As flies enter a door they usually fly upward, and it will be seen that in opening the door the action of the bars $c'$ $c^2$ will give the fringe a slight motion or throw inward toward the door-opening, and the flies entering will be driven back.

$d'$ is a row of fringe secured to the edge of the door and extending from the lower end of the fringe $d$ nearly to the floor.

$e$ is a rod secured to rod $c'$, and extended vertically upward therefrom for a short distance, and then bent outward and slightly downward in position to be engaged by and brush the top of the door as the latter is opened, as shown in Fig. 2.

$e'$ is a fringe or brush secured and depending from that portion of the rod $e$ which engages with the top of the door. I preferably connect the rod $e$ to the rod $c'$ by a clamp, so the rod $e$ may be removed at pleasure. The rod $e$, being secured to the rod $c'$ and provided with fringe $e'$, will brush along the top of the door as it is opened and knock off any flies that may be thereon, and will also drive back any flies that attempt to come in over the door.

Having thus described my invention, what I claim, and desire to secure by Letters Patent, is—

1. In combination with a door, a fringe or fly-brush connected to the jamb and to the top of the door, and automatically swinging into the doorway when the door is opened and swinging out of said doorway when the door is closed, substantially as set forth.

2. A brush-carrier, $c$, having its arms $c'$ $c^2$ provided with the fringe $d$, and secured respectively to the jamb and the door near the top of the latter, and connected by the coil-spring $c^3$, and arranged to operate substantially as and for the purposes set forth.

3. The combination, with the brush-carrier $c$, having its arms secured to the door and the jamb, of the rod $e$, provided with fringe $e'$, secured to one of the arms of spring $c$, and extended outward and arranged to brush the top of the door as the latter is opened, substantially as and for the purposes set forth.

In testimony whereof I affix my signature in presence of two witnesses.

HENRY H. BALTZLEY.

Witnesses:
STEPHEN M. COOMS,
LEANDER LONG.